United States Patent
Batten et al.

(10) Patent No.: US 6,859,871 B1
(45) Date of Patent: Feb. 22, 2005

(54) METHOD AND APPARATUS FOR REDUCING POWER CONSUMPTION IN A PIPELINED PROCESSOR

(75) Inventors: Dean Batten, Allentown, PA (US); Paul Gerard D'Arcy, Harleysville, PA (US); C. John Glossner, Allentown, PA (US); Sanjay Jinturkar, Bethlehem, PA (US); Jesse Thilo, Bethlehem, PA (US); Kent E. Wires, Phillipsburg, NJ (US)

(73) Assignee: Agere Systems Inc., Allentown, PA (US)

( * ) Notice: Subject to any disclaimer, the term of this patent is extended or adjusted under 35 U.S.C. 154(b) by 888 days.

(21) Appl. No.: 09/174,936

(22) Filed: Oct. 19, 1998

(51) Int. Cl.[7] .............................................. G06F 15/00
(52) U.S. Cl. ........................ 712/208; 712/219; 712/233
(58) Field of Search ........................ 713/300; 712/210, 712/204, 214, 215, 218, 23, 208, 200, 217, 226, 233, 234, 236; 717/6, 9

(56) References Cited

U.S. PATENT DOCUMENTS

| | | | | |
|---|---|---|---|---|
| 5,471,593 A | * | 11/1995 | Branigin ..................... | 712/235 |
| 5,590,351 A | * | 12/1996 | Sowadsky et al. ............ | 712/23 |
| 5,761,476 A | * | 6/1998 | Martell ........................ | 712/219 |
| 5,799,180 A | * | 8/1998 | Shiell et al. ................. | 395/581 |
| 5,857,104 A | * | 1/1999 | Natarjan et al. ............. | 395/705 |
| 5,933,618 A | * | 8/1999 | Tran et al. ................... | 712/217 |
| 5,991,874 A | * | 11/1999 | Mill et al. ................... | 712/300 |
| 6,157,996 A | * | 12/2000 | Christie et al. ............. | 712/218 |

OTHER PUBLICATIONS

D.A. Patterson and J.L. Hennessy, "Computer Architecture: A Quantitative Approach," Second Edition, Morgan Kaufmann, San Francisco, CA, pp. 240–261, 300–303, 1996.
Texas Instruments TMS320C62xx Technical Brief, Lit. No. SPRU197, Jan. 1997.

* cited by examiner

Primary Examiner—Frantz B. Jean

(57) ABSTRACT

The invention provides techniques for reducing the power consumption of pipelined processors. In an illustrative embodiment, the invention evaluates the predicates of predicated instructions in a decode stage of a pipelined processor, and annuls instructions with false predicates before those instructions can be processed by subsequent stages, e.g, by execute and writeback stages. The predicate dependencies can be handled using, e.g., a virtual single-cycle execution technique which locks a predicate register while the register is in use by a given instruction, and then stalls subsequent instructions that depend on a value stored in the register until the register is unlocked. As another example, the predicate dependencies can be handled using a compiler-controlled dynamic dispatch (CCDD) technique, which identifies dependencies associated with a set of instructions during compilation of the instructions in a compiler. One or more instructions are then grouped in a code block which includes a field indicating the dependencies associated with those instructions, and the instructions are then, e.g., either stalled or decoded serially, based on the dependencies present in the code block. By eliminating unnecessary processing for false-predicate instructions, the invention significantly reduces the power consumption of the processor.

20 Claims, 3 Drawing Sheets

FIG. 3
(PRIOR ART)

|     |              | 1 | 2 | 3 | 4    | 5    | 6 |
|-----|--------------|---|---|---|------|------|---|
| $I_1$ | sub r1,r2,r3 | F | D | R | $E_I$ | W    |   |
| $I_2$ | sub r4,r5,r1 |   | F | D | R    | $E_I$ | W |

FIG. 4
(PRIOR ART)

|     |               | 1 | 2 | 3 | 4       | 5       | 6       | 7       | 8       | 9       | 10      | 11      | 12 |
|-----|---------------|---|---|---|---------|---------|---------|---------|---------|---------|---------|---------|----|
| $I_1$ | mult r4,r2,r3 | F | D | R | $E_{M1}$ | $E_{M2}$ | $E_{M3}$ | $E_{M4}$ | $E_{M5}$ | $E_{M6}$ | $E_{M7}$ | $E_{M8}$ | W  |
| $I_2$ | sub r4,r6,r8  |   | F | D | R       | $E_I$    | W       |         |         |         |         |         |    |

FIG. 5
(PRIOR ART)

|     |              | 1 | 2    | 3 | 4    | 5 | 6 |
|-----|--------------|---|------|---|------|---|---|
| $I_1$ | op1 r1,r2,r3 | A | $W_1$ | B | $R_1$ | C |   |
| $I_2$ | op1 r3,r4,r5 |   | A    | $W_1$ | B | $R_1$ | C |

FIG. 6
(PRIOR ART)

|     |                     | 1 | 2 | 3 | 4 | 5    | 6    |
|-----|---------------------|---|---|---|---|------|------|
| $I_1$ | setpred p1,0        | F | D | R | E | $W_p$ |      |
| $I_2$ | (p1==1) add r1,r2,r3 |   | F | D | R | E    | $W_d$ |

|   |   | 1 | 2 | 3 | 4 | 5 | 6 | 7 | 8 | 9 | 10 | 11 | 12 |
|---|---|---|---|---|---|---|---|---|---|---|---|---|---|
| $I_1$ | setpred $p_1$ | F | $D_1$ | R | E | W |   |   |   |   |   |   |   |
| $I_2$ | ($p_1$) add r1,r2,r3 |   | F' | $D_1$ | X | $D_2$ | R | E | W |   |   |   |   |
| $I_3$ | setpred $p_3$ |   |   | F | $D_1$ | X | X | R | E | W |   |   |   |
| $I_4$ | ($p_3$) add r5,r6,r9 |   |   |   | F | $D_1$ | X | X | X | $D_2$ | R | E | W |

```
ccdd(!RAW,!WAW,!WAR,!pred){

(p1==0) r9 = r9 + r4;
    (p3==0) s5 = s5 + s3;
    (p2==1) t7 = t7 * t4;

}
```

|   |   | 1 | 2 | 3 | 4 | 5 | 6 | 7 | 8 |
|---|---|---|---|---|---|---|---|---|---|
| $I_1$ | ccdd 3,15 | F | D | R | E | W |   |   |   |
| $I_2$ | (!$p_1$) r9 = r9 + r4 |   | F | D | R | E | W |   |   |
| $I_3$ | (!$p_3$) s5 = s5 + s3 |   |   | F | D | R | E | W |   |
| $I_4$ | ($p_2$) t7 = t7 * t4 |   |   |   | F | D | R | E | W |

METHOD AND APPARATUS FOR REDUCING POWER CONSUMPTION IN A PIPELINED PROCESSOR

FIELD OF THE INVENTION

The present invention relates generally to microprocessors and other types of digital data processors, and more particularly to digital data processors which utilize pipelined processing techniques.

BACKGROUND OF THE INVENTION

Modern processors are often pipelined, meaning that execution of each instruction is divided into several stages. FIG. 1 shows a functional block diagram of a conventional pipelined processor 10. This exemplary pipelined processor includes five stages: a fetch (F) stage 12, a decode (D) stage 14, a read (R) stage 15, an execute (E) stage 16, and a writeback (W) stage 18. Pipelined processors such as processor 10 may be register-based, i.e., other than for load or store instructions, the source(s) and destination(s) of each instruction are registers. The fetch unit 12 retrieves a given instruction from an instruction memory. The decode stage 14 determines the source operand(s) of the instruction and the resultant register location(s), the read stage 15 reads the source register(s) and predicate register(s) specified by the instruction, and the writeback stage 18 writes to the destination register(s) specified by the instruction. It should be noted that in a four-stage implementation of processor 10, the functions of the read stage 15 may be incorporated into the decode stage 14.

In the execute stage 16, the instruction is executed by one of four specialized execution units, for each of which the number of cycles is denoted by the number of boxes: a 1-cycle integer (I) unit 20, an 8-cycle integer/floating point multiplier (M) 22, a 4-cycle floating point adder (Fadd) 24, or a 15-cycle integer/floating point divider (Div) 26. The execution units in this example are fully pipelined, i.e., can accept a new instruction on every clock cycle. These specialized units are used to execute particular types of instructions, and each of the units may have a different latency. An instruction is said to be "dispatched" when it has completed register read and begun execution in the execution stage 16. In other words, a dispatch takes place when an instruction passes from the read stage 15 to one of the execution units in execution stage 16.

Pipelined processors such as that shown in FIG. 1 may utilize predicated instructions, also known as conditional instructions. Predicated instructions may or may not contribute to the final result of program execution. If the condition, or predicate, is true, i.e., equal to a logic one, the instruction is executed normally. However, if the predicate is false, i.e., equal to a logic zero, measures must be taken to remove the results of the partially-processed instruction. This process is called annulling the instruction, and includes the removal of instruction results, exceptions, etc. that are initiated by the instruction in earlier pipeline stages. In typical processors, annulling takes place in the execute stage of the pipeline.

FIG. 2 illustrates the encoding of a high-level language instruction 30 with and without predication. In this example, the instruction 30 is encoded in assembler code for two different instruction set architectures (ISAs), one of which includes predicated instructions and one of which does not. As shown in the first column of table 32 in FIG. 2, the ISA that does not make use of predication tests a variable x in register $r_1$ and branches past the following instruction, i.e., branches past the ADD instruction to the instruction with the label "Resume," if the variable x does not equal zero. The second column of table 32 indicates that the same effect can be achieved by a single predicated instruction which is executed if the variable x is equal to zero.

A significant problem with conventional pipelined processors such as processor 10 of FIG. 1 is that the use of a pipeline introduces data hazards which are not present in the absence of a pipeline, because results of previous instructions may not be available to a subsequent; instruction. This is often attributable to the different latencies of the various execution units in the processor. Types of data hazards which can arise in conventional pipelined processors include, for example, Read After Write (RAW) data hazards, Write After Write (WAW) data hazards, and Write After Read (WAR) data hazards.

FIG. 3 illustrates an exemplary RAW data hazard, showing how the pipelined processor 10 of FIG. 1 executes sub instructions $I_1$ and $I_2$ for processor clock cycles 1 through 6. Instruction $I_1$ subtracts the contents of its source registers $r_2$ and $r_3$ and writes the result to its destination register $r_1$. Instruction $I_2$ subtracts the contents of its source registers $r_5$ and $r_1$ and writes the result to its destination register $r_4$. It can be seen that, unless otherwise prevented, the instruction $I_2$ in the conventional processor 10 will read register $r_1$ in clock cycle 4, before the new value of $r_1$ is written by instruction $I_1$, resulting in a RAW data hazard. In a non-pipelined processor, the instructions as shown in FIG. 3 would not create a hazard, since instruction $I_1$ would be completed before the start of instruction $I_2$.

FIG. 4 illustrates an exemplary WAW data hazard, arising when the processor executes instructions $I_1$ and $I_2$ for processor clock cycles 1 through 12. Instruction $I_1$ multiplies the contents of its source registers $r_2$ and $r_3$ and writes the result to its destination register $r_4$. Instruction $I_2$ subtracts the contents of its source registers $r_6$ and $r_8$ and writes the result to destination register $r_4$. It can be seen that, unless otherwise prevented, instruction $I_2$ in the conventional pipelined processor will write to register $r_4$ in clock cycle 6, before instruction $I_1$, and then $I_1$ will incorrectly overwrite the result of $I_2$ in register $r_4$ in clock cycle 12. This type of hazard could arise if, for example, instruction $I_1$ were issued speculatively by a compiler for a branch which was statically mispredicted between $I_1$ and $I_2$. In the case of in-order instruction completion, instruction $I_1$ will not affect the outcome, since in-order completion will discard the result of $I_1$. However, as described above, the hazard is significant in the presence of out-of-order instruction completion.

A WAR hazard occurs, e.g., when register reads are allowed to be performed during later stages and register writes are allowed to be performed in the earlier stages in the pipeline. The exemplary five-stage pipelined processor 10 of FIG. 1 is thus incapable of producing a WAR hazard, but such hazards can arise in other pipelined processors. FIG. 5 illustrates an exemplary WAR data hazard arising in a five-stage pipelined processor including stages A, $W_1$, B, $R_1$ and C. In this processor, stages A, B and C are generic pipeline stages, stage $W_1$ writes an intermediate result to a destination register, and stage $R_1$ reads the source registers for processing in stage C. The processor executes instructions $I_1$ and $I_2$ for processor clock cycles 1 through 6. Instruction $I_1$ applies an operation op1 to the contents of its source registers $r_2$ and $r_3$ and writes the result to its destination register $r_1$. Instruction $I_2$ applies an operation op2 to the contents of its source registers $r_4$ and $r_5$ and writes the result to destination register $r_3$. Note that an intermediate result is written to destination register $r_3$ in the $W_1$ stage of $I_2$ before the intended value of $r_3$ can be read in the $R_1$ stage of $I_1$, thereby introducing a WAR hazard.

Predicated instructions also can create hazards in pipelined processors. For example, the processor hardware generally must check the validity of the predicate used for each predicated instruction before it can determine whether or not the instruction should be executed. FIG. 6 shows an example of a predication hazard which can arise in the conventional five-stage pipelined processor 10 of FIG. 1. The processor executes instructions $I_1$ and $I_2$ for processor clock cycles 1 through 6. The instruction $I_1$ is a setpred operation which sets the predicate p1 to a value of 0. It will be assumed that the predicate p1 is true, i.e., has a value of 1, before execution of this instruction. The instruction $I_2$ is a predicated instruction which, if the predicate p1 is true, performs an add operation using source registers $r_2$ and $r_3$ and destination register $r_1$. Note that $I_2$ will be executed in this example even though p1 should be false at the point that $I_2$ dispatches, thereby introducing a predication hazard. $W_p$ and $W_d$ in FIG. 6 represent writeback stages to predication and data registers, respectively. It should be noted that predication hazards, like data hazards, can also be grouped into RAW, WAW or WAR hazards. The predication hazard illustrated in FIG. 6 is a RAW predication hazard.

The continually increasing clock speeds and transistor densities associated with modern processors have made power consumption a key issue in processor design, particularly for processors used in applications such as portable computing and wireless communication. Conventional techniques for reducing processor power consumption include, for example, the use of a stand-by or "sleep" mode, in which several key features of the processor are disabled if no use is detected for a given amount of time. Another known technique is clock frequency reduction, in which the operational clock frequency of the processor is reduced from the maximum allowable frequency, which results in a decrease in overall power consumption.

The manner in which predicated instructions are processed can also have a significant impact on power consumption. Power is dissipated in every stage of a pipeline. Particularly costly stages in terms of power consumption include the read, execute and writeback stages. As noted above, in a conventional pipelined processor, an instruction is annulled on the basis of a predicate in the execute stage of a pipeline, as is described in, e.g., D. A. Patterson and J. L. Hennessy, "Computer Architecture: A Quantitative Approach," pp. 300–303, Morgan Kaufmann, 1996. An example of a processor of this type is the Texas Instruments TMS320C62xx processor which is described in Texas Instruments TMS320C62xx Technical Brief, Lit. No. SPRU197, January 1997. The TMS320C62xx processor has an 11-stage pipeline, and the stages can be grouped into three categories: fetch, decode and execute. This processor utilizes predicated instruction execution, and instructions with a false predicate are annulled following the first execute stage, i.e., stage 7. Other processors, such as processors based on the Sun Microsystems SPARC architecture, use an approach known as branch annulling, in which conditional branches are annulled before the execution stage of the pipeline if the condition is false. In the branch annulling approach, if a branch behaves as predicted, an instruction in a branch delay slot is executed normally. If the branch prediction is incorrect, the instruction in the delay slot is annulled just before the execute stage. However, these and other conventional processors fail to provide significant reductions in power consumption.

SUMMARY OF THE INVENTION

The invention provides techniques for reducing the power consumption of pipelined processors which utilize predicated instructions. In contrast to conventional predicated processors, a processor in accordance with the invention evaluates the predicates of predicated instructions and annuls false-predicate instructions during the decode stage of the pipeline. This prevents false-predicate instructions that require no further processing from being processed by subsequent pipeline stages, e.g., execute and writeback stages, which are typically the pipeline stages that consume the most power. The invention thus provides a pipelined processor that consumes less power than typical pipelined processors with predicated instructions.

In accordance with another aspect of the invention, predicate dependencies can be handled using, e.g., a virtual single-cycle execution technique which locks a predicate register while the register is in use by a given instruction, and then stalls subsequent instructions that depend on a value stored in the register until the register is unlocked. As another example, the predicate dependencies can be handled using a compiler-controlled dynamic dispatch (CCDD) technique, which identifies dependencies associated with a set of instructions during compilation of the instructions in a compiler. One or more instructions are then grouped in a code block which includes a field indicating the dependencies associated with those instructions, and the instructions are, e.g, either stalled or decoded serially, based on the dependencies present in the code block.

By eliminating unnecessary processing for false-predicate instructions, the invention significantly reduces the power consumption of the processor. Advantageously, the invention can provide this reduction in power consumption without increasing hardware or processing complexity. The invention is particularly well suited for use in microprocessors and digital signal processors, but could be utilized in any type of digital data processor. These and other features and advantages of the present invention will become more apparent from the accompanying drawings and the following detailed description.

BRIEF DESCRIPTION OF THE DRAWINGS

FIGS. 3 through 6 illustrate data and predication hazards which can arise in the conventional pipelined processor of FIG. 1.

DETAILED DESCRIPTION OF THE INVENTION

Figures 1, 2:
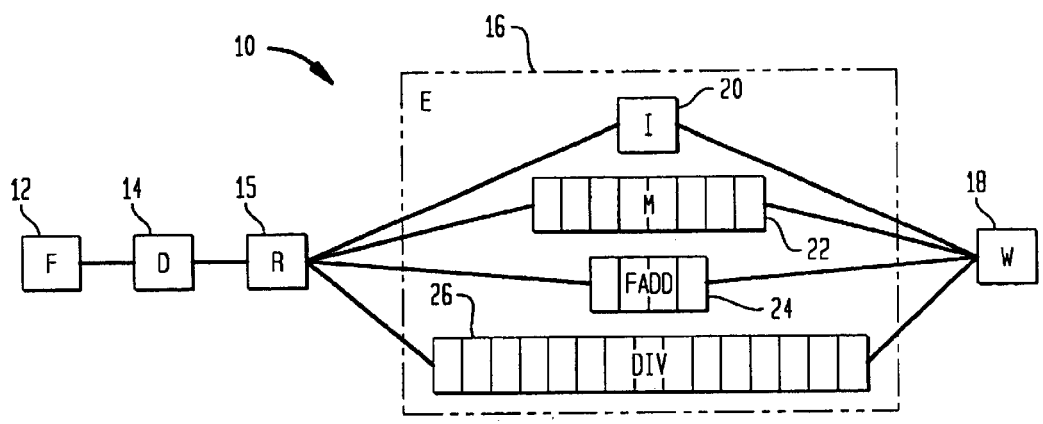
FIG. 1 is a functional block diagram of a conventional pipelined processor.
FIG. 2 illustrates the encoding of a conditional instruction using predication.

The invention will be illustrated below in conjunction with exemplary pipelined processors and processing systems. It should be understood, however, that the invention is more generally applicable to any processor or processing system in which it is desirable to reduce power consumption while also avoiding data hazards, predication hazards, or other similar problems. The term "processor" as used herein is intended to include any device in which instructions retrieved from a memory or other storage element are executed using one or more execution units. Exemplary processors in accordance with the invention may therefore include, for example, microprocessors, central processing units (CPUs), very long instruction word (VLIW) processors, single-issue processors, multi-issue processors, digital signal processors, application-specific integrated circuits (ASICs), personal computers, mainframe computers, network computers, workstations and servers, and other types of data processing devices, as well as portions and combinations of these and other devices. The term "predicated processor" refers to a processor which utilizes predicated instructions. The term "compiler" is intended to include any software program or other device which processes code of a particular level, e.g., source code, to generate corresponding code of a lower level, e.g., object code or executable code. A compiler may therefore be implemented as a device which also performs other non-compiler functions, for example, as a preprocessor/compiler, or as a stand-alone device. A "code block" refers generally to a set of one or more instructions.

The term "pipeline dependency" as used herein is intended to include any dependency which may give rise to a data hazard, a predication hazard, or any other type of hazard or similar occurrence in a processor. This is to be distinguished from an architectural dependency, as described in U.S. patent application Ser. No. 08/997,117 filed Dec. 16, 1997 in the names of inventors Paul G. D'Arcy, C. John Glossner, Sanjay Jinturkar and Stamatis Vassiliadis, and entitled "Compiler Controlled Dynamic Scheduling (CCDS) of Program Instructions," which is incorporated by reference herein. An architectural dependency generally does not give rise to a hazard but instead places constraints on the order of execution of delimited instructions so that proper program order may be preserved. A given pipeline dependency may be identified by the type of hazard that it produces, e.g., a pipeline dependency may be referred to as a RAW, WAW or WAR dependency, if it gives rise to a RAW, WAW or WAR hazard, respectively. An indication of type of pipeline dependency may therefore be implemented as an indication of the possible corresponding type of hazard. Depending upon the implementation of a particular pipeline, a given pipeline dependency may or may not produce a hazard in that pipeline.

The present invention reduces power consumption in a pipelined processor by early annulling of predicated instructions. As noted previously, annulling of a predicated instruction in a conventional predicated processor is typically performed in the execute stage of a pipeline. If the predicate is false, the instruction is annulled. However, by this time, the instruction may have already been processed by the fetch, decode, read and possibly execute stages of the pipeline. By reducing the number of stages which process an instruction with a false predicate, the invention significantly reduces the power consumption of a pipelined processor.

In an illustrative embodiment of the invention, a pipelined processor is configured such that annulling of predicated instructions occurs during the decode stage of the pipeline. Once the predicate is determined, it may be used in the decode stage as follows: if the predicate is false, to annul the instruction, e.g., to stop further processing of the instruction by the read, execute and writeback stages; and if the predicate is true, to engage further processing of the instructions. The predicate in this illustrative embodiment can be specified by a single bit, which is easily implementable in the decode stage hardware. In other words, the predicate can be considered to be a boolean variable since it can take one of two possible values. The terms "true" and "false" are used in the description to refer to these two values, and should be construed to include any binary values. One or more special instructions may be incorporated into the ISA to handle predication, such as, for example, instructions which allow the setting and resetting of the predicate values. Since an instruction with a false predicate is annulled during the decode stage and is not processed by any of the subsequent, and generally higher power consumption, stages of the pipeline, this embodiment of the invention efficiently reduces the overall power consumption of the processor. For example, applying the invention to the five-stage pipelined processor of FIG. 1 would prevent an instruction whose predicate evaluated to false from being processed by the read, execute and writeback stages, which saves a significant amount of power.

The above-described embodiment of the invention may be implemented in an otherwise conventional decode circuit of a pipelined processor. Instead of using similar logic to annul the instruction in a later pipeline stage, as in a conventional predicated processor, a processor in accordance with the invention includes a circuit which can read the value of the predicate, e.g., substantially simultaneously with the decoding of the instruction itself. If the predicate is determined to be false, the instruction is annulled prior to the read, execute and writeback stages, and the power that was to be dissipated in these stages is conserved. If the predicate is determined to be true, the instruction is executed normally. As noted above, this is in contrast to a conventional predicated processor, in which annulling logic is utilized in the execute stage, and the instruction is annulled following execution. Since the invention can utilize the same or very similar logic for determining the predicate and performing other decoding operations, the hardware requirements for implementing the invention are minimal, while processor performance based on power dissipation metrics is significantly increased. As will be apparent to those skilled in the art, an otherwise conventional decode circuit can be modified in a straightforward manner to incorporate one or more of the features of the invention described herein.

The manner in which the invention deals with predication dependencies will now be described in greater detail. The invention can make use of a number of different techniques for handling predication dependencies, including, e.g., the impatient execution (IE) approach described in U.S. patent application Ser. No. 09/080,787 filed May 18, 1998 and entitled "Virtual Single-Cycle Execution in Pipelined Processors," and the compiler controlled dynamic dispatch (CCDD) approach described in U.S. patent application Ser. No. 09/152,744 filed Sep. 14, 1998 and entitled "Compiler-Controlled Dynamic Instruction Dispatch in Pipelined Processors," both of which are incorporated by reference herein. The above-described illustrative embodiment can be used with CCDD or IE, both of which are suitable techniques for dealing with predication dependencies.

Figures 7, 8, 9, 10:
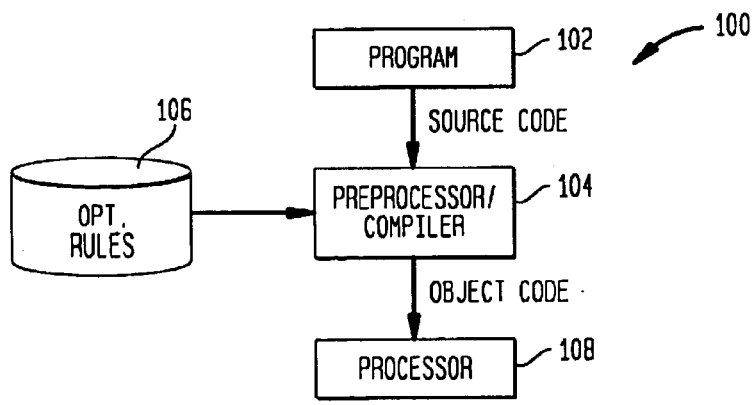
FIG. 7 illustrates the operation of an embodiment of the invention which utiliies a register locking mechanism.
FIG. 8 shows a code block used in conjunction with a compiler-controlled dynamic dispatch (CCDD) technique in an illustrative embodiment of the invention.
FIG. 9 illustrates the operation of an embodiment of the invention which utilizes compilercontrolled dynamic dispatch.
FIG. 10 is a block diagram of an exemplary processing system in which the invention may be implemented using a CCDD technique.

In an embodiment of the invention in which the IE technique is used, a predicate register is locked while it is being set, reset or otherwise processed. Subsequent instructions that depend on a value stored in the register are stalled until the correct value becomes available. In other words, if the register is not locked, instructions can use it without fear of a hazard, but if it is locked, the instructions must wait until it becomes unlocked to use it. FIG. 7 shows an example of the manner in which a pipelined processor in accordance with the invention utilizes IE to handle predicate dependencies. Instructions $I_1$ and $I_3$ are instructions which set the value of the predicates $p_1$ and $p_3$, respectively. Instructions $I_2$ and $I_4$ are predicated instructions, the execution of which is dependent on the value of the predicates $p_1$ and $p_3$, respectively. It is assumed in this example that the results of the execute stage for a given instruction can be forwarded through suitable hardware to the decode stage for the following instruction.

In accordance with the invention, the decode stage in the FIG. 7 example is divided into two substages, $D_1$ and $D_2$. In substage $D_1$, the instruction is decoded and a determination is made as to whether or not the instruction is predicated. If the instruction is not predicated, either no action is invoked in substage $D_2$, or $D_2$ can be bypassed altogether for that instruction. For simplicity, it is assumed in this example that $D_2$ is bypassed when the instruction is not predicated, i.e., substage $D_2$ is bypassed for the instructions $I_1$ and $I_3$ in FIG. 7. However, it should be noted that, in general, a setpred instruction may itself be predicated. If the instruction is predicated, the intended predicate register is determined in $D_1$, and the value of that predicate is read in $D_2$. An instruction with a false predicate is annulled at this point. If the intended predicate register is locked, as is the case with predicated instructions $I_2$ and $I_4$ in the FIG. 7 example, $D_2$ is not initiated until the predicate register becomes unlocked. Stalls in the pipeline are indicated by an "X" in the FIG. 7 example. Since predicated instruction $I_2$ depends on the predicate being set in $I_4$, $D_2$ for instruction $I_2$ cannot be performed until after the execute stage of $I_1$. Similarly, since predicated instruction $I_4$ depends on the predicate being set in $I_3$, $D_2$ for instruction $I_4$ cannot be performed until after the execute stage of $I_3$. This embodiment of the invention, and other embodiments of the invention based on IE or similar approaches, may make use of suitable locking mechanisms for predicate registers, as described in greater detail in U.S. patent application Ser. No. 09/080,787.

Another embodiment of the invention utilizes the above-noted CCDD technique to deal with predication dependencies. CCDD avoids data predication hazards by, e.g., encapsulating a block of instructions into a CCDD instruction which also specifies the data and predication hazards that are present in the code block. A compiler may be used to determine all register, address and predicate pipeline dependencies, and thus all data and predication hazards, in a given code block. The instructions in the given code block are therefore executed using only those stalls, if any, that may be necessary to protect against the hazards actually present in that block. If the block does not contain any pipeline dependencies giving rise to a hazard, the instructions in that block may be executed serially without any processor check or stalls. CCDD thus improves instruction execution in pipelined processors by eliminating unnecessary stalls.

FIGS. 8 and 9 show an example of the manner in which a pipelined processor in accordance with the invention utilizes CCDD to handle predicate dependencies. Using CCDD, the predication dependencies are determined at compile time. If a CCDD instruction delimiting a code block indicates that there are no predication hazards within the block, the instructions can be executed serially and the predicates can be read during the decode stage in accordance with the techniques of the invention. If predication hazards do exist, each predicated instruction is stalled until there are no longer any predication hazards. FIG. 8 shows an example of an encapsulated CCDD code block which includes a number of predicated instructions. In this code block, there are no predication hazards in the predicated instructions. The encapsulated code block therefore includes a header "ccdd (!RAW, !WAW, !WAR, !pred)" which specifies that there are no data hazards or predication hazards in the code block. The predicated instructions can therefore execute serially without any stalls. Referring to FIG. 9, the CCDD instruction $I_1$ denotes that the following three instructions, i.e, instructions $I_2$, $I_3$ and $I_4$, are specified as part of the CCDD code block, and that the dtype of the block is "15," which is a predetermined value indicating that there are no data or predication hazards in the block. Since this is the case, the predicated instructions $I_2$, $I_3$ and $I_4$ are able to issue serially with no pipeline stalls, as shown in FIG. 9. Of course, the values of the predicates $p_1$, $p_2$ and $p_3$ determine whether or not the read, execute and writeback stages of the corresponding instructions are ever completed.

FIG. 10 shows a simplified block diagram of an exemplary processing system 100 in which the invention may be implemented. In the system 100, a program 102 provides source code as an input to a preprocessor/compiler 104. The preprocessor/compiler 104 performs both a preprocessing function and a compiler function in the illustrative embodiment of FIG. 10. Alternatively, the system 100 could include, e.g., a separate preprocessor and a separate compiler, or only a compiler. The preprocessor/compiler 104 processes the source code of the program 102 to identify pipeline dependencies which can lead to the previously-described data or predication hazards. The source code generally includes instructions configured in accordance with an instruction set architecture (ISA). A set of optimization rules 106 are used by the preprocessor/compiler 104 in the processing of the source code. The preprocessor/compiler 104 uses the optimization rules 106 to generate, from the source code of program 102, corresponding object code which may be executed by a processor 108. Conventional operations performed by the preprocessor/compiler 104 are described in, for example, A. Aho et al., Compilers: Principles, Techniques and Tools, Addison-Wesley, 1988, which is incorporated by reference herein. Processor 108 may be a pipelined processor, such as processor 10 of FIG. 1, or any other suitable processor. Another exemplary processor suitable for use as processor 108 in system 100 is described in greater detail in the above-cited CCDS U.S. patent application Ser. No. 08/997,117 filed Dec. 16, 1997.

The above-noted exemplary CCDD instruction may be part of an ISA supported by the system 100. The CCDD instruction shown in FIG. 8 is assumed to be an instruction issued by a compiler, such as preprocessor/compiler 104, at compile time. The CCDD instruction encapsulates a code block, and indicates what types of hazards, if any, occur within the block. As described in greater detail in the above-cited U.S. patent application Ser. No. 09/152,744, the CCDD instruction may include a tag field, an opcode field, a numInstr field, a dtype field and a rsv field. The tag and opcode fields are used within a specific implementation to identify the CCDD instruction, and the rsv field is reserved for use in implementing other, possibly unrelated, functions. The numInstr field specifies the number of subsequent instructions in the program 102 that are to be included within the block of code corresponding to the CCDD instruction. For example, the numInstr field of instruction $I_1$ in FIG. 9 specifies that the following three instructions are part of the same code block. As noted above, the dtype field is used to specify the type of pipeline dependencies, and thus the types of hazards, that occur within the corresponding block of code. It should be noted that, in an alternative embodiment, processor 108 of FIG. 10 may be configured to implement an IE technique using suitable locking mechanisms for the predicate registers, in place of CCDD.

It should be noted that the invention can be used in conjunction with conventional techniques designed to eliminate predication dependencies, including, for example, reservation stations or a dynamic scheduling approach such as Tomasulo's algorithm. These and other conventional techniques suitable for use with the invention are described in D. A. Patterson and J. L. Hennessy, "Computer Architecture: A Quantitative Approach," Morgan Kaufmann, 1996, which is incorporated by reference herein. The invention can also be used in conjunction with other known power reduction techniques such as, for example, stand-by or "sleep" modes of operation, and clock frequency reduction.

The present invention may be configured to meet the requirements of a variety of different processing applications and environments, using any desired type of pipelining and any type of processor. It should also be noted that the invention may be implemented at least in part in software, e.g., using a machine-readable medium, such as an electronic memory or a magnetic or optical disk containing one or more programs which, when executed in a computer or other processor, provide the functions described herein. The above-described embodiments of the invention are therefore intended to be illustrative only. Numerous alternative embodiments within the scope of the following claims will be apparent to those skilled in the art.

What is claimed is:

1. A method of processing instructions in a processing system, the method comprising the steps of:
   evaluating a predicate of a predicated instruction in a decode stage of a pipelined processor of the system; and
   annulling the predicated instruction in the decode stage if the predicate has a particular value.

2. The method of claim 1 wherein the annulling step includes preventing further processing of the predicated instruction by at least one other stage of the pipelined processor if the predicate is false.

3. The method of claim 1 further including the step of enabling further processing of the predicated instruction by at least one other stage of the pipelined processor if the predicate is true.

4. The method of claim 1 further including the steps of:
   locking a predicate register while the register is in use by a given instruction; and
   stalling subsequent instructions that depend on a value stored in the register until the register is unlocked.

5. The method of claim 1 wherein the evaluating step further includes the steps of:
   decoding a given instruction, and determining if the given instruction is a predicated instruction, in a first substage of the decode stage;
   determining in a second substage of the decode stage an intended predicate register for the given instruction, and a value stored in that register, if the given instruction is a predicated instruction; and
   bypassing the second substage of the decode stage if the given instruction is not a predicated instruction.

6. The method of claim 1 further including the steps of identifying pipeline dependencies associated with the instruction during compilation of the instruction in a compiler.

7. The method of claim 6 further including the steps of:
   identifying pipeline dependencies associated with a plurality of instructions; and
   associating one or more of the plurality of instructions with a code block having an indicator of the type of dependencies in the code block.

8. The method of claim 7 further including the step of decoding the instructions of the code block serially without stalls if the indicator indicates that there are no predication dependencies in the code block.

9. The method of claim 7 further including the step of stalling at least one of the instructions of the code block if the indicator indicates that a predication dependency exists in the code block.

10. An apparatus for processing instructions, the apparatus comprising:
    a processor operative to evaluate a predicate of a predicated instruction in a decode stage thereof, and to annul the predicated instruction in the decode stage if the predicate has a particular value.

11. The apparatus of claim 10 wherein the processor is further operative to prevent further processing of the predicated instruction by at least one other stage of the processor if the predicate is false.

12. The apparatus of claim 10 wherein the processor is further operative to enable further processing of the predicated instruction by at least one other stage of the processor if the predicate is true.

13. The apparatus of claim 10 wherein the processor is further operative to lock a predicate register while the register is in use by a given instruction, and to stall subsequent instructions that depend on a value stored in the register until the register is unlocked.

14. The apparatus of claim 10 wherein the processor is further operative to decode a given instruction, and determine if the given instruction is a predicated instruction, in a first substage of the decode stage; to determine in a second substage of the decode stage an intended predicate register for the given instruction, and a value stored in that register, if the given instruction is a predicated instruction; and to bypass the second substage of the decode stage if the given instruction is not a predicated instruction.

15. The apparatus of claim 10 further including a compiler operative to determine pipeline dependencies associated with the instruction during compilation of the instruction.

16. The apparatus of claim 15 wherein the compiler is further operative to identify pipeline dependencies associated with a plurality of instructions; and to associate one or more of the plurality of instructions with a code block having an indicator of the type of dependencies in the code block.

17. The apparatus of claim 15 wherein the processor is further operative to, decode the instructions of the code block serially without stalls if the indicator indicates that there are no predication dependencies in the code block.

18. The apparatus of claim 10 wherein the processor is further operative to stall at least one of the instructions of the code block if the indicator indicates that a predication dependency exists in the code block.

19. A machine-readable medium containing one or more programs which when executed on a processor implement the steps of:
    evaluating a predicate of a predicated instruction in a decode stage of a pipelined processor of the system; and
    annulling the predicated instruction in the decode stage if the predicate has a particular value.

20. The machine-readable medium of claim 19 wherein the one or more programs implement the steps of:

preventing further processing of the predicated instruction by at least one other stage of the pipelined processor if the predicate is false; and enabling further processing of the predicated instruction by at least one other stage of the pipelined processor if the predicate is true.

* * * * *